United States Patent Office 2,924,366
Patented Feb. 9, 1960

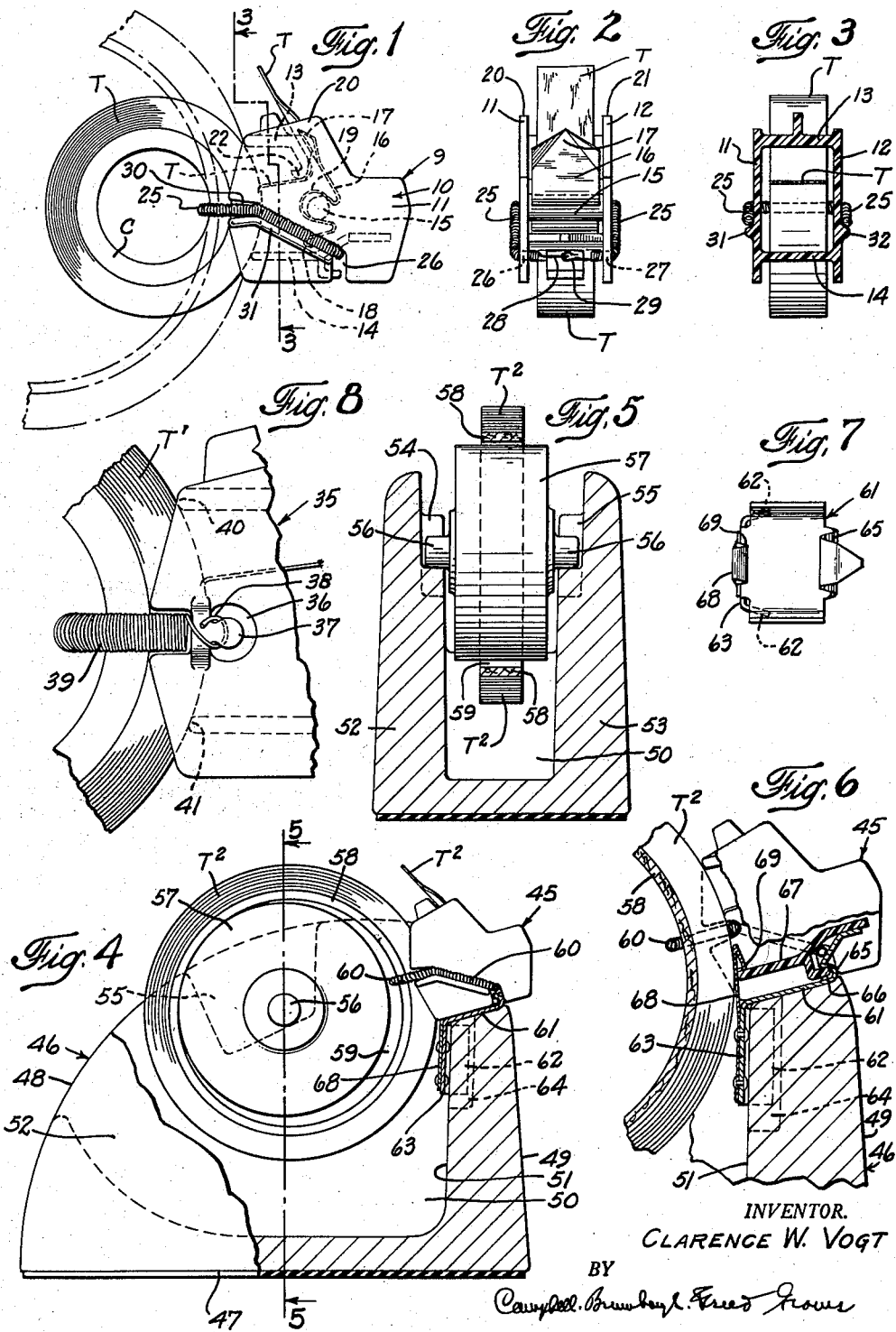

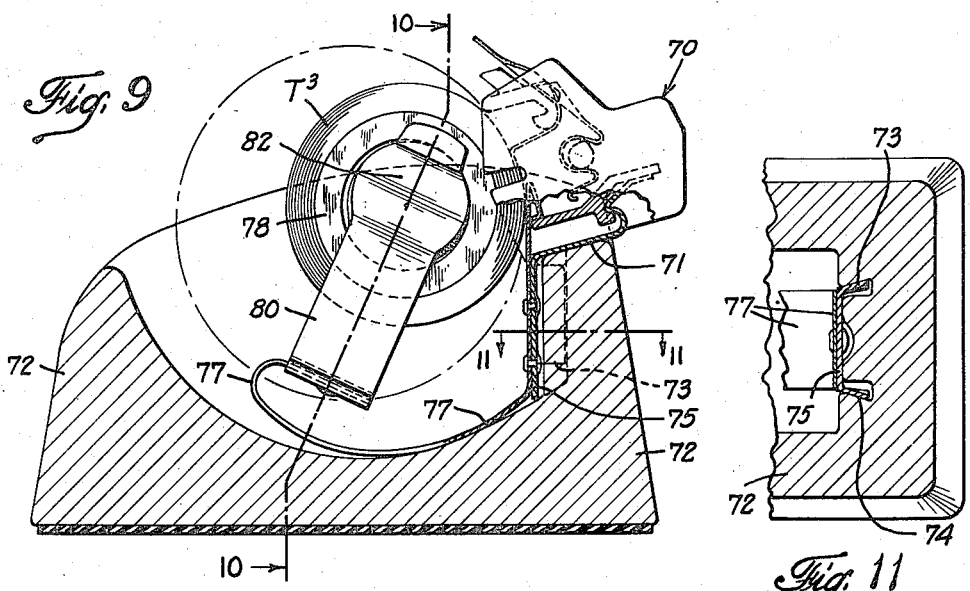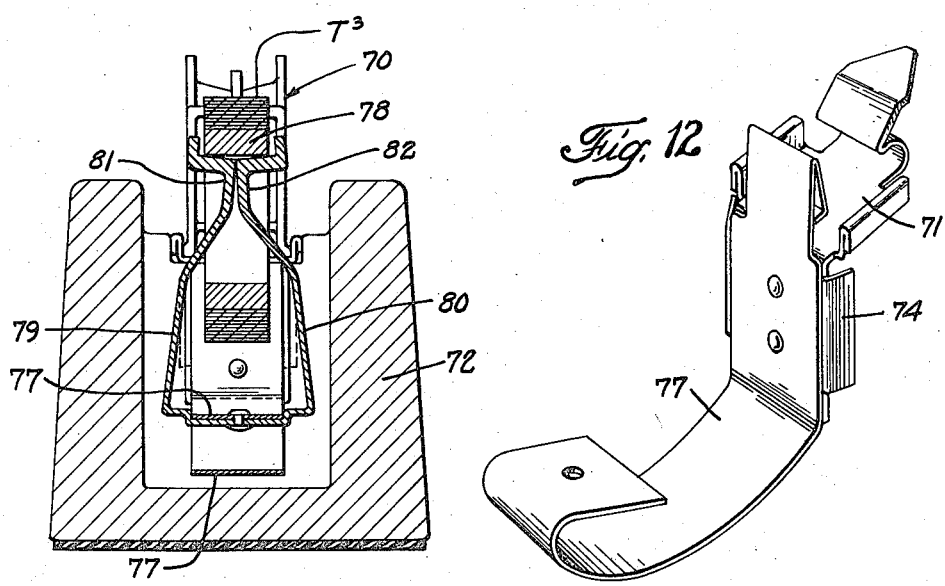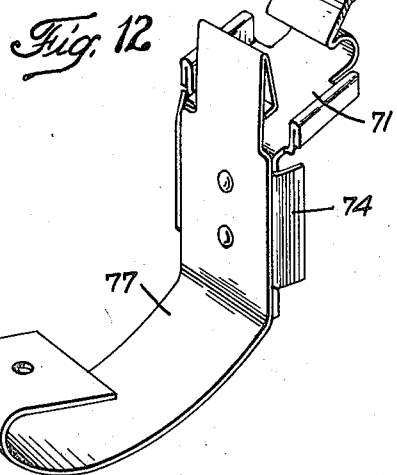

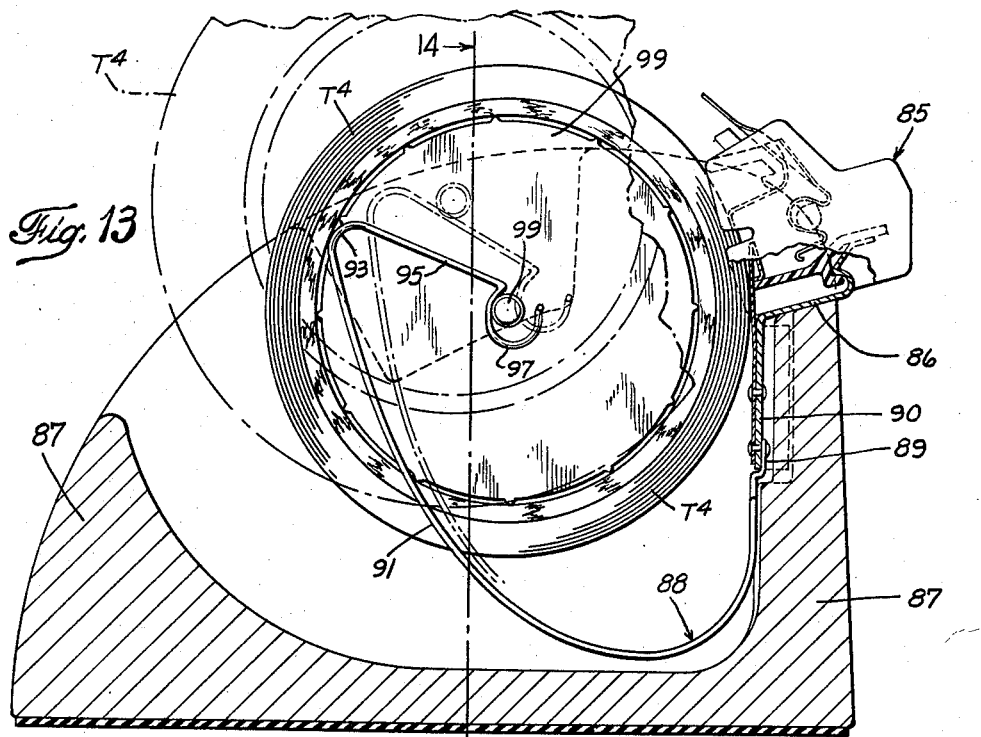
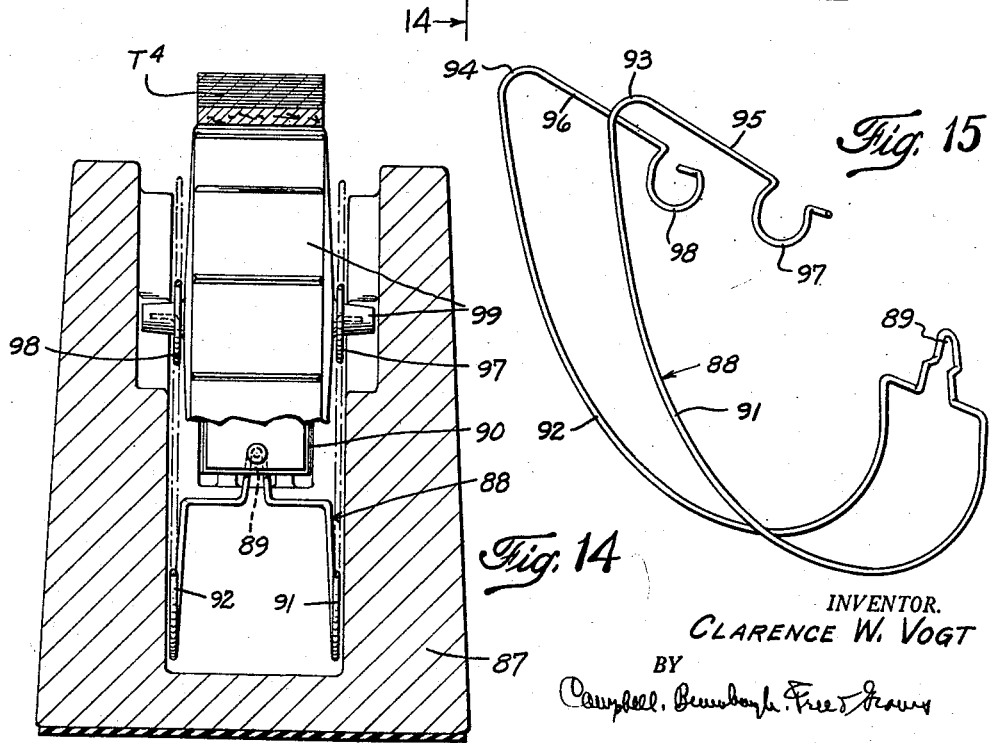

2,924,366

TAPE DISPENSING AND CUTTING DEVICE

Clarence W. Vogt, Weston, Conn.

Application January 7, 1955, Serial No. 480,347

12 Claims. (Cl. 225—66)

This invention relates to improvements in devices for dispensing and cutting adhesive tapes, such as fibrous and plastic tapes having a pressure-sensitive adhesive on a surface thereof and it relates particularly to an improved mechanism for supporting a roll of tape on a cutting device to facilitate dispensing and cutting of the tape and storage of the tape and cutting devices.

Heretofore, the devices provided for holding and supporting a roll of tape to enable it to be unwound from the roll and cut by means of a cutter on the support have included a spindle or its equivalent mounted on a frame or holder and engaging in the hollow core of the roll of tape and supporting it for rotation. The holder usually is provided with a blade for severing the tape spaced from the spindle a distance that is usually substantially greater than the radius of the roll of tape when it is completely full. Because of this relationship of the cutting blade to the roll, there is a relatively long span of tape, usually an inch or more in length, between the surface of the roll and the cutting blade. The span is unprotected so that the adhesive on the surface of the tape is exposed to the air and dirt and dust and frequently loses its tackiness and becomes so dirty and unattractive in appearance that it must be discarded. This is especially true in the case of insulating tapes, such as electrician's tapes, which are kept in the electrician's tool box and thus come in contact with grease and oil and other materials which may completely neutralize the ability of the exposed section of the tape to adhere to wires or other electrically conductive members on which the tape is used. Moreover, the prior tape cutters and roll holders are not very sturdy and when used with the more durable tape, such as electrician's tape, plastic tapes, fiber glass tapes and the like, the spool or roll of tape is likely to be pulled out of the holder when the tape is being cut and the holder bent or damaged.

The present invention includes a simplified mechanism for maintaining a roll of tape in a predetermined relation to a tape cutting device so that only a very short length of the unwound tape is exposed to atmosphere at any time, regardless of whether a full roll or an almost exhausted roll of tape is used with the cutting device. More particularly, in accordance with the present invention, a resilient member, such as a spring, is used to support a roll of tape in contact with abutment and guide surfaces on the rear of a frame in which a cutting blade is mounted. The abutment surfaces are in such relation to the blade that only a very short length of tape is required to span the space between the outer periphery of the roll and the cutting edge of the blade. The resiliency of the spring device always maintains the roll of tape against the abutment surfaces so that the length of unwound span of tape does not increase as the roll of tape is used up and the roll of tape remains attached to the cutting device without any danger of the roll of tape being displaced, lost or unwound.

It thus affords a simple and inexpensive means for holding the roll of tape on the cutting device.

The supporting means described above has the advantages of preventing waste of the tape by drying out of the adhesive or loss of its adhesive properties by settling of dirt and dust thereon or the like and it also affords a convient means for connecting the roll of tape to the cutting device and for supporting the roll of tape in a desk-type of tape holder and dispenser.

Other advantages of the new device will become apparent from the following description of typical examples of the invention as disclosed in the accompanying drawings in which:

Fig. 1 is a view in side elevation of a tape dispensing and cutting device including means for supporting a roll of tape in proper relation to the cutting device and embodying the present invention;

Fig. 2 is a view in front elevation of the device shown in Fig. 1;

Fig. 3 is a view in cross-section taken on line 3—3 of Fig. 1;

Fig. 4 is a view in side elevation and partly broken away illustrating a desk or table type of supporting dispensing and cutting mechanisms for tapes embodying the present invetnion;

Fig. 5 is a view in section taken on line 5—5 of Fig. 4;

Fig. 6 is an enlarged view of a portion of the device shown in Fig. 4 with a part of the cutting device broken away and a part of the support for the cutting device shown in section to disclose details thereof;

Fig. 7 is a plan view of a clip member for holding the tape cutting device on the desk holder;

Fig. 8 is a view in side elevation of a portion of the tape cutter and a roll of tape illustrating a modified form of supporting device embodying the present invention;

Fig. 9 is a view in side elevation and partly in section of a modified type of desk tape dispenser;

Fig. 10 is a view in section of the dispenser taken on line 10—10 of Fig. 9;

Fig. 11 is a view in section taken on line 11—11 of Fig. 9;

Fig. 12 is a perspective view of a clip and spring mechanism for holding the cutting device and roll of tape in proper relationship for dispensing and cutting of the tape;

Fig. 13 is a view in vertical section through a modified type of desk tape dispenser showing the cutting device partly broken away to illustrate the mechanism for holding the cutter mechanism on the holder;

Fig. 14 is a view in section taken on line 14—14 of Fig. 13; and

Fig. 15 is a perspective view of the spring mechanism for urging the tape against the cutting mechanism.

The present invention will be described with reference to its use in conjunction with a tape cutting device 9 of the type disclosed in my copending application Serial No. 465,903, filed November 1, 1954, now U.S. Patent No. 2,839,140, dated June 17, 1958. As illustrated in Figs. 1 to 3, the tape cutting device 9 includes a frame 10 having side plates 11 and 12 which are maintained in spaced relation by means of an upper snubbing bar 13 and a lower spacing and attaching plate 14 which are interposed between and formed integral with or joined permanently to the side plates 11 and 12. Interposed between the bar 13 and the plate 14 is a pivot member or shaft 15 upon which is mounted a cutting blade 16 of generally W-shape having a pointed cutting edge 17 at one end, and a reversely curved snubber end 18 at its opposite end. The mid-portion 19 of the blade is formed to snap around the pivot member 15 and enable the blade to move to the position shown in Fig. 1, in which the cutting edge 17 is directed upwardly and slightly rearwardly to hold the tape T between the snubbing bar 13 and the back of the blade. It will be seen that the cutting edge 17 of the blade is protected by the upward extensions 20 and 21 on the side plates 11 and 12 when in its raised position. The blade also can rock down into a generally horizontal position in which the snubbing end 18 of the blade engages the tape T and holds it in contact with the lower curved edge 22 of the snubbing bar 13 so that the tape can be tensioned and pulled over the cutting edge without unwinding additional tape from the roll. The cutting device thus far described is illustrated and described in greater particularity in the aforementioned copending application.

In accordance with the present invention, the cutting device 9 can be modified to support a roll of tape T in close relation thereto so that only a relatively short unprotected span of the tape is permitted between the surface of the roll and the blade thereby affording protection to the adhesive on the upper surface of the tape, as viewed in Fig. 1, against contamination by dirt and the like. As shown in Figs. 1 and 2, the roll of tape T which may be of almost any desired size as indicated by the rolls shown in dotted lines therein, is supported in contact with the rear edges of the snubber bar 13 and the connecting plate 14; these edges forming spaced apart abutment surfaces for guiding the roll of tape and allowing it to rotate relative to the cutting device 9. The roll is maintained in engagement with the bar 13 and plate 14 by means of a coiled tension spring 25 which passes through the hollow core C of the roll of tape, extends lengthwise of the side plates 11 and 12, passes through the notches 26 and 27 in the lower edges of the side plates and has its ends detachably connected by means of the loops 28 and 29 formed on the ends of the spring. The spring does not have to have substantial strength because its sole purpose is to support the weight of a full roll of tape T. Thus, a spring having a tension of two to four ounces is strong enough to support almost any of the rolls of tape that are commonly manufactured and sold. It will be appreciated, of course, that stronger springs may be used in industrial applications where very large rolls of tape are used.

In order to further assure proper positioning of the spring 25 and the roll of tape T, the side plates 11 and 12 may be provided with rearwardly opening notches 30 in their rear edges about midway between the snubber bar 13 and the plate 14. The spring extends through the notches 30 and thereby is prevented from shifting up and down as the tape roll is unwound. The side plates 11 and 12 together with the spring centralize the tape roll with respect to the frame 10. Further, the side plates may be provided with angularly inclined ribs 31 and 32 which aid in positioning the spring and also afford grips for engagement by the fingers to enable the cutting device 9 to be gripped more firmly while the tape is being unwound and cut.

While the spring 25 has been chosen as a most desirable medium for retaining the roll T in contact with the abutment surfaces on the frame 10, it will be appreciated that other resilient means, such as spiral springs, elastic cords or bands, may be used in "throw-away" types of cutting devices. Moreover, the spring may be attached to the cutting device 9 in many different ways. For example, as shown in Fig. 8, a tape cutter 35 like the device 9 described above, may be provided with cut-outs 36 in its side walls forming ears 37 around which the looped opposite ends 38 of a spring 39 engage to thereby hold the spring under tension and position a roll of tape T' in proper relation to the abutment surfaces 40 and 41. The ears 37 can project outwardly beyond the outer surface of each side plate of the cutter 35, or, as illustrated in Fig. 8, can be disposed entirely within the areas of the side plates.

Roll-retaining means of the type described are easily adapted to and are highly useful with desk types of tape holders and cutters. Thus, as shown in Figs. 4 to 7, a cutting device 45 like the cutting device 9, may be used in conjunction with a roll of tape $T^2$ in a desk type holder 46. The holder 46 may be of substantially any desired shape and may be made of any suitable material, such as plastic, glass, metal, wood or the like. As shown, it has a flat base 47, an arcuate rear and upper edge 48 and a substantially flat front face 49. A recess 50 is formed in the interior of the holder 46 and it has a substantially vertical front edge 51 forming with the surface 49 the front wall of the holder. If desired, the side walls 52 and 53 of the holder on opposite sides of the recess 50 may be provided with internal recesses 54 and 55 to receive a supporting spindle 56 on which the roll of tape $T^2$ is mounted. As indicated in Fig. 4, the spindle 56 is provided with a disk-like hub portion 57 of substantially smaller diameter than the internal diameter of the core 58 of the roll of tape $T^2$ so that a space 59 is left through which the supporting spring 60 extends. In this device, the spring 60 urges the roll of tape $T^2$ toward the cutting device while the internal spindle 56, 57 supports the roll and guides it toward the holder 46.

As shown in Figs. 6 and 7, the cutting device 45 is detachably mounted in the holder 46 by means of a clip 61. The clip 61 is, in turn, detachably mounted in the holder 46 by means of the diverging flanges 62 on a downwardly projecting arm 63 of the clip. A pair of diverging grooves 64 are formed in the wall 51 of the recess to receive the flanges 62 slidably and detachably.

The clip 61 includes a reversely curved, stiff end portion 65 which engages a forwardly extending flange 66 on the spacing and attaching plate 67 of the device 45. Also, a spring tongue 68 extends upwardly from the arm 63 and has an undercut portion 69 to engage over the rear edge of the attaching plate 67. It will be apparent that with this arrangement, the cutting device 45 can be readily snapped into the spring clip or detached therefrom merely by pressing back the tongue 68.

The spring supporting means for the roll of tape is susceptible to further modification and, as shown in Figs. 9 to 12, inclusive, it may form a part of a supporting clip which is detachably connected to a cutting device. Thus, as best shown in Fig. 9, the cutting device 70 is detachably received in the spring clip 71, like the spring clip 61 described above, and is held in a weighted holder 72 by means of the diverging flanges 73 and 74 on the downwardly extending arm 75 of the clip. A curved leaf spring 77 formed of spring metal, springy plastic or the like, is connected to the arm 75 and extends partially around the periphery of the roll of tape $T^3$. If desired, the outer end of the spring 77 can bear against the surface of the roll of tape and thereby urge it against the abutment surfaces on the cutter member 70. However, in those types of tapes which have a core 78 provided with central recesses, it is desirable to provide the spring arms 79 and 80, shown in Figs. 9 and 10, which are mounted on the outer reversely bent end of the spring 77 and have inwardly indented portions 81 and 82 to engage in the recessed spool ends to support the roll of tape $T^3$ for rotation. In this type of device, the entire weight of the spool is supported by the spring and the inclinations of the spring 77 and the arms 79 and 80 thereon are such as to urge the roll of tape $T^3$ against the abutment surfaces of the cutting device at all times.

The spring mechanism may be further modified, as shown in Figs. 13 to 15. In this modification, the cutting device 85 is retained by means of a clip 86, like the clips 61 and 71, in the desk type holder 87. The principal difference between the tape dispensing device shown in Figs. 13 to 15 and that shown in Figs. 10 to 12 is the form of the spring. A spring support may be formed, as shown in Fig. 15, of a piece of spring wire 88 which is bent at its mid-portion to form a reduced connecting eye 89 by means of which it is riveted or otherwise secured to the downwardly extending arm 90 of the clip. The opposite arms of the spring 88 are bent outwardly and then into parallel relation to form parallel arcuate portions 91 and 92 which extend downwardly and then upwardly and are reversely bent at 93 and 94 to form spaced straight parallel arms 95 and 96 having loops 97 and 98 thereon for receiving a supporting spindle 99 on which a roll of tape $T^4$ is received. The arms of the spring 88 are bent in such fashion that the roll of tape $T^4$ is positioned between them and is urged thereby against the abutment surfaces of the tape holder.

From the preceding description, it will be apparent that tape holders and roll supports have been provided by means of which rolls of tape of any desired size can be held in proper relation to the blade of a tape cutting device so that a minimum amount of tape is left unwound between dispensing and cutting operations and a minimum waste of tape results therefrom.

It will be appreciated that the spring devices described herein for maintaining the proper relation between the cutting device and the roll of tape are susceptible to considerable modification and that the springs may be attached in other ways to the cutting device and to the roll of tape to maintain the desired relations between them. Accordingly, the forms of the invention described herein should be considered as illustrative and not as limiting the scope of the following claims.

I claim:

1. A tape dispenser and cutter comprising a frame, a cutting blade for cutting tape having an adhesive on one surface thereof, means in said frame supporting said blade in position to cut said tape, a snubber bar extending transversely of said frame, a connecting plate extending transversely of said frame in spaced relation to said snubber bar, said supporting plate and said snubber bar having rearwardly disposed edges forming spaced surfaces to engage the periphery of a roll of tape and support it for unrolling movement with the major portion of said roll disposed outside of said frame, and resilient means on said frame engaging said roll of tape and resiliently retaining it in contact with said surfaces.

2. The tape dispenser and cutter set forth in claim 1, in which said resilient means is a coil spring extending through said roll of tape.

3. The tape dispenser and cutter set forth in claim 1, in which said resilient means is a coil spring and said frame comprises ears thereon detachably engaged by the ends of said spring, said spring having its mid-portion passing through the roll of tape.

4. The tape dispenser set forth in claim 1, in which said resilient means is a spring having one end connected detachably to said frame and its other end including means engaging said roll of tape, said spring extending around a portion of the periphery of said roll.

5. The tape dispenser set forth in claim 1, in which said resilient means is a spring wire having spaced arms disposed on opposite sides of said roll of tape, the spring wire having a mid-portion detachably connected to said frame and its arms detachably connected with said roll.

6. A tape dispenser and cutter comprising a frame having spaced apart side walls, a transverse pivot member connecting said walls, a snubber bar extending between said side walls for engaging a surface of said tape, a connecting plate extending between said side walls in spaced relation to said pivot member and said snubber bar, said connecting plate and said snubber bar having edges forming abutment surfaces, a cutter member mounted movably on said pivot member to engage tape passing between said abutment surfaces and side walls, a spring member mounted on said frame and having a portion engageable with a roll of said tape to urge said roll into engagement with said abutment surfaces.

7. A tape dispenser and cutter comprising a frame having spaced apart side walls, a transverse pivot member connecting said walls and a pair of spaced apart abutment surfaces extending between said side walls adjacent to one edge of said frame, each side wall having a notch in one edge between said abutment surfaces, a cutter member mounted movably on said pivot member to engage tape passing between said abutment surfaces and side walls, a spring member mounted on said frame and passing through and positioned by said notches and having a portion engageable with a roll of said tape to urge said roll into engagement with said abutment surfaces.

8. The tape dispenser set forth in claim 6, in which said spring member is a coil spring having loops at its opposite ends and said side walls have ears thereon engageable in said loops to retain said spring in position.

9. A tape dispenser and cutter comprising a frame having spaced apart side walls, a transverse pivot member connecting said walls and a pair of spaced apart abutment surfaces extending between said side walls adjacent to one edge of said frame, each side wall having a raised rib extending to an edge of said side wall between said abutment surfaces, a cutter member mounted movably on said pivot member to engage tape passing between said abutment surfaces and side walls, a spring member mounted on said frame and having a portion engageable with a roll of said tape to urge said roll into engagement with said abutment surfaces, said spring means comprising a coiled tension spring looped around said frame and lying against said ribs to position the roll with respect to said abutment surfaces.

10. The tape dispenser and cutter set forth in claim 6 in which said connecting plate has a rearward edge forming one of said abutment surfaces and a forwardly directed edge, and comprising a spring clip having portions detachably engaging said rearward and forward edges of said connecting plate, said spring member being connected at one end to said clip and supporting the roll with its other end.

11. The tape dispenser set forth in claim 10, comprising a weighted holder for said frame having a recess therein to receive said roll, and means on said clip detachably engageable with said holder to releasably retain said frame on said holder with the roll in said recess.

12. The tape dispenser set forth in claim 6, in which said side walls project beyond said abutment surfaces to form guides positioning said roll against extended lateral movement relative to said frame.

References Cited in the file of this patent

UNITED STATES PATENTS

| | | |
|---|---|---|
| 1,624,235 | Hall | Apr. 12, 1927 |
| 1,980,619 | Garrett | Nov. 13, 1934 |
| 2,248,482 | Shearer | July 8, 1941 |
| 2,574,175 | Erhardt | Nov. 6, 1951 |
| 2,685,416 | Smith | Aug. 3, 1954 |